(12) United States Patent
Bader

(10) Patent No.: US 7,475,610 B2
(45) Date of Patent: Jan. 13, 2009

(54) VEHICLE GEARBOX

(75) Inventor: Josef Bader, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 335 days.

(21) Appl. No.: 10/575,316

(22) PCT Filed: Sep. 15, 2004

(86) PCT No.: PCT/EP2004/010291

§ 371 (c)(1), (2), (4) Date: Jun. 2, 2006

(87) PCT Pub. No.: WO2005/037590

PCT Pub. Date: Apr. 28, 2005

(65) Prior Publication Data

US 2006/0283275 A1    Dec. 21, 2006

(30) Foreign Application Priority Data

Oct. 13, 2003    (DE) ............................... 103 47 493

(51) Int. Cl.
*F16H 3/08* (2006.01)
(52) U.S. Cl. ...................................................... 74/333
(58) Field of Classification Search .................. None
See application file for complete search history.

(56) References Cited

U.S. PATENT DOCUMENTS 5,370,014 A * 12/1994 Pigozzi et al. ................ 74/331
5,967,939 A    10/1999 Reik et al.
6,244,409 B1    6/2001 Winkelmann et al.
6,907,975 B2    6/2005 Doremus et al.

FOREIGN PATENT DOCUMENTS

| DE | 36 07 701 A1 | 9/1987 |
|---|---|---|
| DE | 44 22 900 A1 | 11/1994 |
| DE | 196 27 980 A1 | 1/1997 |
| DE | 199 51 414 A1 | 5/2000 |
| DE | 10 102 300 A1 | 7/2002 |
| EP | 1 059 470 A1 | 12/2000 |
| FR | 2 595 299 | 9/1987 |
| FR | 2 757 460 | 6/1998 |
| FR | 2 830 586 | 4/2003 |
| GB | 2 119 460 A | 11/1983 |

* cited by examiner

*Primary Examiner*—Dirk Wright
(74) *Attorney, Agent, or Firm*—Davis & Bujold, P.L.L.C.

(57) ABSTRACT

A vehicle gearbox (2) comprising a housing (4), wherein or whereon torque-transmitting components (14, 16, 18, 20, 30) are provided, comprising a coupling device (30) arranged between the vehicle gearbox (2) and a drive machine (8) driving the vehicle gearbox (2), wherein actuating elements (40, 46, 56, 60, 64, 66) are arranged in order to actuate the torque-transmitting components (14, 16, 18, 20, 30). The housing (4) comprises an area extending in the direction of the coupling device (30), wherein a connection plate (32), which can be firmly connected to the housing (4), is provided. Recesses are provided in the connection plate (32) for at least parts of the actuating elements (40, 46, 56, 60, 64, 66) for actuation of the torque-transmitting components (14, 16, 18, 30, 30).

14 Claims, 2 Drawing Sheets

VEHICLE GEARBOX

This application is a national stage completion of PCT/EP2004/010291 filed Sep. 15, 2004 which claims priority from German Application Serial No. 103 47 493.5 filed Oct. 13, 2003.

FIELD OF THE INVENTION

The invention concerns a vehicle gearbox.

BACKGROUND OF THE INVENTION

Vehicle gearboxes of modern design comprise a large number of functionalities, which have to be accommodated in the housing of the vehicle gearbox. In the case of automated gearboxes, if the actuators have to be integrated in or on the gearbox, this makes its design elaborate and cost-intensive. At the same time, requirements relating to assembly methods appropriate for industrial practice must be fulfilled to make it easier for the assembler to combine together the individual structural elements of the gearbox in a manner suited to the case while avoiding assembly methods which are too complex and expensive.

To give an example, DE-A1 44 22 900 by the present Applicant shows a vehicle gearbox with a connection plate which is attached firmly on the transmission housing by screw-bolts and which is arranged in an area of the housing that extends toward a coupling device. On one of the countershafts of the vehicle gearbox, a transmission brake is arranged, parts of which are provided in the connection plate. The arrangement of actuating elements for actuating the torque-transmitting components in the gearbox and the arrangement of a clutch actuator are not described.

The purpose of the present invention is to integrate actuating elements of a vehicle gearbox at a central position in a manner appropriate for practical assembly.

SUMMARY OF THE INVENTION

A vehicle gearbox comprises a housing in or on which torque-transmitting components are provided. These also include a coupling device between the vehicle gearbox and a drive machine which drives the vehicle gearbox. Actuating elements for actuating the torque-transmitting components are arranged on or in the housing. The housing comprises an area extending in the direction of the coupling device in which a connection plate is provided that can be attached firmly to the housing. Lodgements are provided in this connection plate for at least parts of the actuating elements for actuating the torque-transmitting components. In an advantageous embodiment of the invention, a lodgement is provided in the connection plate for at least parts of an actuating device of the coupling device between the drive machine and the vehicle gearbox. Preferably, the coupling device is a clutch with central disengagement. Particularly advantageously, the connection plate on the coupling device is made in the form of two tubes, one inside the other, and an actuating piston is arranged so that it can move axially in the annular space between the tubes.

In a further advantageous embodiment of the invention, a lodgement is provided in the connection plate for actuating elements that shift gear wheels of the vehicle gearbox into or out of a torque-transmitting condition. Preferably, the actuating elements are parts of a shift system of a main gearbox section and/or of a splitter group gearset and/or of a range-change group gearset of the vehicle gearbox. The actuating elements advantageously comprise pneumatic cylinders, one part of which is formed by the connection plate and one part of which is formed by the housing.

A vehicle gearbox of such design with a connection plate enables the advantageous and assembly-friendly integration of many essential components and functional elements at a central location. Besides the clutch actuation and the actuation of the shift elements, at least parts of the transmission brakes and of the gearbox oil pump are provided in the connection plate. The connection plate can be made independently of the remainder of the gearbox housing and is, therefore, easily accessible at any points for processing tools. Screw-bolts ensure simple fixing of the connection plate onto the housing during the assembly of the vehicle gearbox.

BRIEF DESCRIPTION OF THE DRAWINGS

The invention will now be described, by way of example, with reference to the accompanying drawings in which.

DETAILED DESCRIPTION OF THE INVENTION

Figure 1:
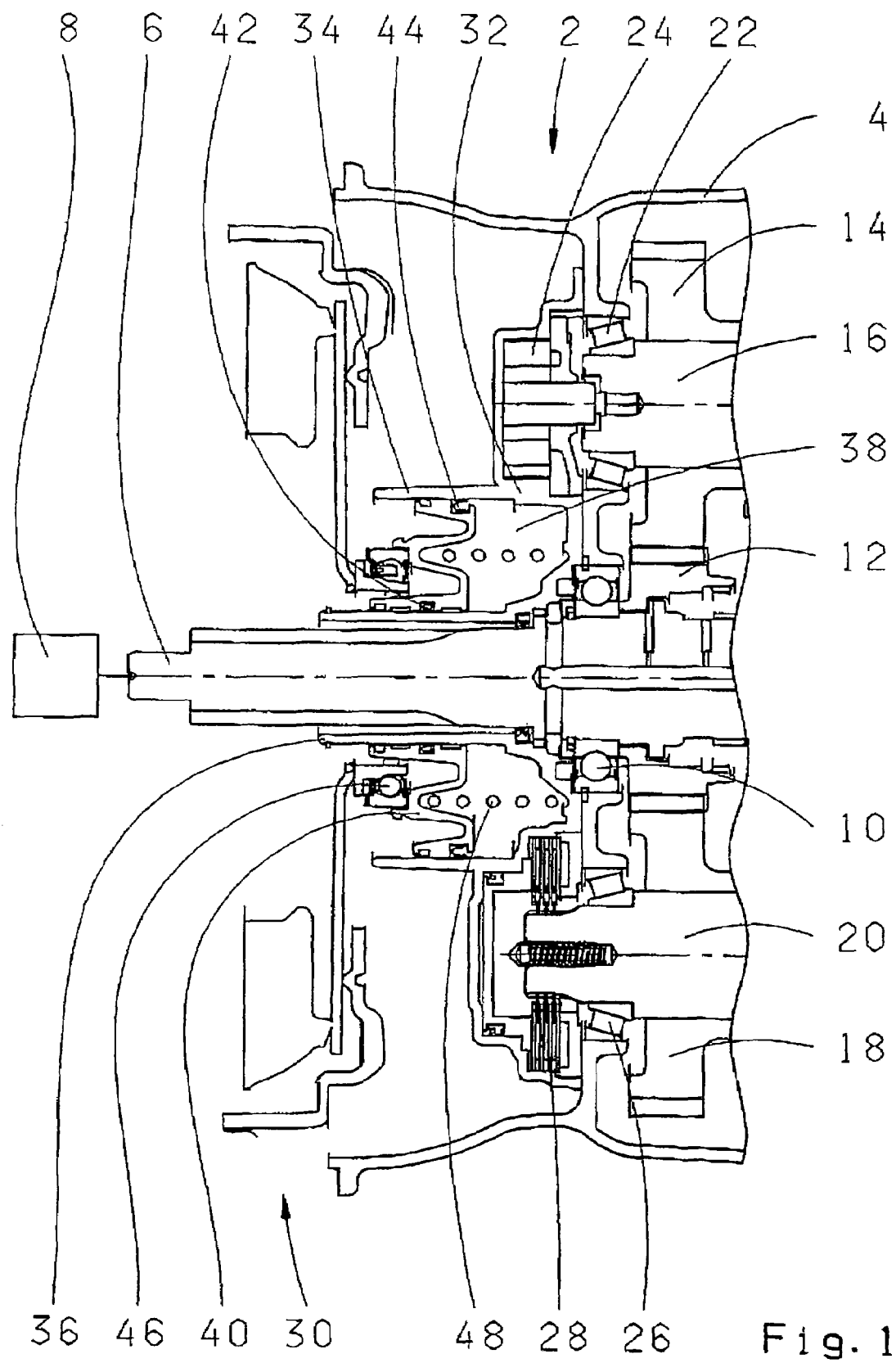
FIG. 1 is a cross-section through part of the vehicle gearbox.

FIG. 1 shows a vehicle gearbox 2 which comprises a housing 4. A drive input shaft 6 is connected to a drive machine 8, as a rule an internal combustion engine, and is mounted in the housing 4 to rotate in a bearing 10. Mounted to rotate with the input shaft 6 is a gear wheel 12 which meshes with a gear wheel 14 on a first countershaft 16 and with a gear wheel 18 on a second countershaft 20.

Here, the invention is described with reference to the vehicle gearbox 2 with power distribution to two countershafts. It retains its validity in the same manner, however, for a gearbox with one countershaft.

The first countershaft 16 is mounted in a conical-roller bearing 22 in the housing 4 and has a transmission pump 24 at one end which is driven by the countershaft 16 for delivering lubricating oil to the gearbox. The second countershaft 20 is mounted in a conical-roller bearing 26 in the housing 4 and has a transmission brake 28 at one end of the known structure which brakes the countershaft 20 and thus also the entire vehicle gearbox 2, and which is used, for example, during gearshift processes. Around the input shaft 6, a coupling device 30 of known structure is arranged between the vehicle gearbox 2 and the drive machine 8, which is not an object of the present invention and of which, here, only parts are, therefore, shown for illustrative purposes.

In the area of the housing 4 that extends toward the coupling device 30 is arranged a connection plate 32, which is fixed firmly to the housing 4, for example, by screw-bolts (not shown here). In a known way, the connection plate 32 accommodates at least parts of the transmission oil pump 24 and the transmission brake 28. Furthermore in the area of the input shaft 6, the connection plate 32 is shaped so as to form two concentric tubes 34 and 36, one inside the other. In an annular space 38 between the tubes 34 and 36, an annular piston 40 is provided. Radially inward toward the tube 36 the said annular piston 40 has a first seal 42 and radially outward toward the tube 34 the annular piston has a second seal 44. The seals 42 and 44 seal the annular space 38 airtight with respect to the surroundings, so that the annular piston 40 can be moved axially by an actuation medium, preferably compressed air, admitted into the annular space 38 so as to actuate a disengagement bearing 46 to open the coupling device 30. Compressed air can be supplied directly through the housing 4, so that hoses and pipes for compressed air delivery are not needed. Electrical leads for a path sensor (not shown here) on the coupling device 30 can also be passed directly through the housing 4 or the connection plate 32. To assist the movement of the annular piston 40, an annular spring 48 is provided, which is accommodated in the annular space 38 between the annular piston 40 and the connection plate 32.

Figure 2:
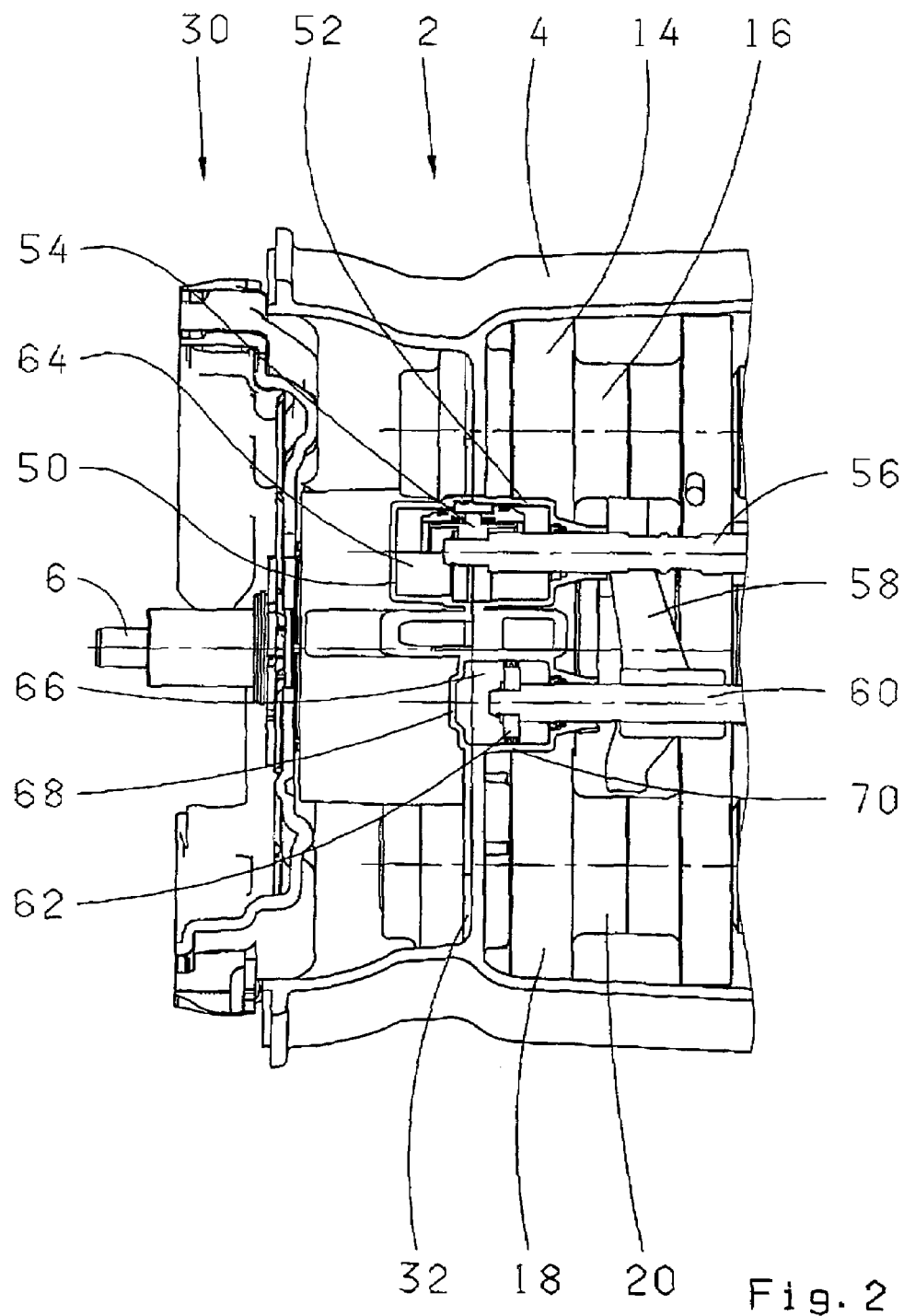
FIG. 2 is another cross-section similar to FIG. 1.

The indexes used in FIG. 2 are the same as those of FIG. 1 for corresponding components. Furthermore, FIG. 2 shows a first cylinder portion 50 in the connection plate 32 which, together with a second cylinder portion 52 formed in the housing 4, constitute an actuation cylinder 64 for a shift device (not shown in any greater detail here) in a main transmission section of the vehicle gearbox 2. For this, in the actuation cylinder 64 formed by the two cylinder portions 50 and 52 is inserted an axially movable piston 54, to which is attached a gearshift rod 56 which extends as far as the main transmission section. This piston 54 is also actuated by compressed air which passes into the actuation cylinder 64 through bores (not shown here) in the connection plate 32 or the housing 4.

A sliding sleeve 58 is part of a splitter group gearset, which is connected upstream from the main transmission section. The sliding sleeve 58 is actuated by a gearshift rod 60 connected to a piston 62. The piston 62 is arranged to move axially in an actuation cylinder 66 and is actuated by compressed air, which can again be delivered to the actuation cylinder 66 through bores in the housing 4 or the connection plate 32. A first cylinder portion 68 of the actuation cylinder 66 is provided in the connection plate 32 and a second cylinder portion 70 is formed by the housing 4.

In a third cylinder (not shown here), another third piston can be arranged which, via a further gearshift rod, shifts the sliding sleeve of a range-change group gearset connected downstream from the main transmission.

REFERENCE NUMERALS 2 vehicle gearbox
4 housing
6 drive input shaft
8 drive machine
10 bearing
12 gear wheel
14 gear wheel
16 countershaft
18 gear wheel
20 countershaft
22 conical-roller bearing
24 transmission pump
26 conical-roller bearing
28 transmission brake
30 coupling device
32 connection plate
34 tube
36 tube
38 annular space
40 annular piston
42 seal
44 seal
46 disengagement bearing
48 annular spring
50 cylinder portion
52 cylinder portion
54 piston
56 gearshift rod
58 sliding sleeve
60 gearshift rod
62 piston
64 actuation cylinder
66 actuation cylinder
68 cylinder portion
70 cylinder portion

The invention claimed is:

1. A vehicle gearbox (2) having a housing (4) incorporating torque-transmitting components (14, 16, 18, 20, 30) and including a coupling device (30) located on an input side of the vehicle gearbox (2) for connection with a drive machine (8) which drives the vehicle gearbox (2), the housing (4) having actuating elements (40, 46, 56, 60, 64, 66) for actuating the torque-transmitting components (14, 16, 18, 20, 30); the vehicle gearbox comprising:

a connection plate (32) having a first tube (36) located concentrically inside a second tube (34) to define an annular space (38) for receiving an annular actuating piston (40) arranged to move axially in the annular space (38) between the first and second tubes (34, 36); and wherein the connection plate (32) is fixedly secured to the housing (4) adjacent an area that extends in a direction of the coupling device (30), and the connection plate (32) having lodgements are for at least parts of the actuating elements (40, 46, 56, 60, 64, 66) for actuating the torque-transmitting components (14, 16, 18, 20, 30).

2. The vehicle gearbox (2) according to claim 1, wherein a first lodgement is provided in the connection plate (32) for supporting at least a portion of an actuating device (40, 46) of the coupling device (30).

3. The vehicle gearbox (2) according to claim 1, wherein the coupling device (30) is a clutch with central disengagement.

4. The vehicle gearbox (2) according to claim 1, wherein a first lodgement is provided in the connection plate (32) for supporting the actuating elements (56, 60, 64, 66) which shift gear wheels (14, 18) of the vehicle gearbox (2) into and out of a torque-transmitting condition.

5. The vehicle gearbox (2) according to claim 4, wherein the actuating elements include parts of a shift system (56, 64) of a main transmission section of the vehicle gearbox (2).

6. The vehicle gearbox (2) according to claim 4, wherein the actuating elements include parts of a shift system (58, 60, 66) of a splitter group gear-set of the vehicle gearbox (2).

7. The vehicle gearbox (2) according to claim 4, wherein the actuating elements Include parts of a shift system of a range-change group gearset of the vehicle gearbox.

8. The vehicle gearbox (2) according to claim 4, wherein the actuating elements (56, 60, 64, 66) include pneumatic cylinders (64, 66), a first part (50, 58) of the pneumatic cylinders (64, 66) being formed by the connection plate (32) and a second part (52, 70) of the pneumatic cylinders (64, 66) being formed by the housing (4).

9. A vehicle transmission for receiving an input drive and transferring torque to a gear system having torque-transmitting components (14, 16, 18, 20, 30), the transmission comprising:

a clutch for engaging and disengaging the input drive with the vehicle transmission;

a connection plate supporting the axial displacement of at least a portion of the clutch, the connection plate comprising:

a central passage for receiving an input shaft an annular space surrounding the central passage for housing an annular actuating device for actuating the clutch; and wherein the central passage is defined by an inner surface of a first cylindrical wall and the annular space for housing the actuating device Is defined between an outer surface of the first cylindrical wall and a second cylindrical wall radially spaced and concentric about the first cylindrical wall and the input shaft.

10. The vehicle transmission for receiving an input drive and transferring torque to a gear system as set forth in claim 9 wherein the connection plate (32) is fixedly secured to the housing (4) and the connection plate (32) having lodgements supporting at least an actuating element directly effecting the torque-transmitting components (14, 16, 18, 20, 30) during a gearshift of the transmission.

11. The vehicle transmission for receiving an input drive and transferring torque to a gear system as set forth in claim 9 wherein the annular actuating device further comprises an axially slidable piston, a multiplicity of seals and a torsion spring, where the piston, the seals, the first tube, and the second tube define an airtight compartment; and wherein a controller adjusts the pneumatic pressure in the airtight compartment and the axially slidable piston can be actuated by the force of the torsion spring and by changes in pneumatic pressure.

12. A vehicle transmission for receiving an input drive and transferring torque to a gear system having torque-transmitting components (14, 16, 18, 20, 30), the transmission comprising:

a clutch for engaging and disengaging the input drive with the vehicle transmission;

a connection plate supporting the axial displacement of at least a portion of the clutch, the connection plate comprising:

a central passage for receiving art input shaft an annular space surrounding the central passage for housing an annular actuating device for actuating the clutch;

the central passage is defined by an inner surface of a first cylindrical tube and the annular space for housing the annular actuating device is defined between an outer surface of the first cylindrical wall and a second cylindrical wall radially spaced and concentric about the first cylindrical wall and the input shaft;

a first lodgement is provided in the connection plate (32) for supporting actuating elements (56, 60, 64, 66) which directly shift gear wheels (14, 18) of the gear system into and out of a torque-transmitting condition; and wherein the actuating elements include parts of a shift system (56, 64) of a main transmission section of the vehicle transmission.

13. The vehicle transmission for receiving an input drive and transferring torque to a gear system as set forth in claim 12 wherein the actuating elements comprise parts of a shift system (58, 60, 66) of a splitter group gearset of the vehicle gearbox (2).

14. The vehicle transmission for receiving an input drive and transferring torque to a gear system as set forth in claim 12 wherein the actuating elements include parts of a shift system of a range-change group gearset of the vehicle gearbox.

* * * * *